(12) United States Patent
Clonts et al.

(10) Patent No.: US 7,116,638 B1
(45) Date of Patent: Oct. 3, 2006

(54) METHOD FOR IDENTIFYING MIS-OPTIONED DATA COMMUNICATIONS CIRCUITS

(75) Inventors: Willis Dean Clonts, Douglasville, GA (US); Donald Fredrick Gedenk, Jr., Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 1047 days.

(21) Appl. No.: 10/151,675

(22) Filed: May 20, 2002

(51) Int. Cl.
*G01R 31/08* (2006.01)
(52) U.S. Cl. .................. 370/249; 370/224; 370/259
(58) Field of Classification Search ............... 375/224, 375/225, 221; 370/249
See application file for complete search history.

(56) References Cited

U.S. PATENT DOCUMENTS 4,862,480 A * 8/1989 Gupta ...................... 375/259
5,166,923 A * 11/1992 Ohmori et al. ............ 370/249
5,301,207 A * 4/1994 Emerson et al. ........... 375/224
6,711,136 B1 * 3/2004 Schneider et al. ......... 370/249

* cited by examiner

Primary Examiner—Hassan Kizou
Assistant Examiner—Albert T. Chou
(74) Attorney, Agent, or Firm—Merchant & Gould

(57) ABSTRACT

Methods for identifying a mis-optioned data communications circuit are provided. A test point is configured providing access to a data communications circuit for operation of a first data communications speed. A test is performed on a communications device remotely located on the data communications circuit that is incompatible with data communications at a second data speed. If the test is successful, the communications device is re-optioned for operation at the second communications speed. The test may comprise a non-latching loop back test and the communications device may comprise a network interface unit or a channel surface unit/data service unit.

13 Claims, 4 Drawing Sheets

METHOD FOR IDENTIFYING MIS-OPTIONED DATA COMMUNICATIONS CIRCUITS

TECHNICAL FIELD

Embodiments of the present invention relate to the field of data communications and, more specifically, to the field of identifying and correctly provisioning mis-optioned data communications circuits.

BACKGROUND OF THE INVENTION

Data communications circuits are available from telecommunications providers that provide point-to-point circuits for communicating over a frame relay network. Typically, these circuits are available in bandwidths from 56 Kb/S–DS-3 speeds. One commonly used bandwidth is called 56 Kb/S with secondary channel. A 56 Kb/S with secondary channel connection provides a 56,000 bit per second digital circuit in combination with a low speed transmission channel that permits simultaneous control and network management transmission to coexist with the main higher speed data channel. The secondary channel typically operates at 16 Kb/S. Therefore, the line speed for a 56 Kb/S communications circuit is 72,000 bits per second.

While 56 Kb/S and secondary channel communications circuits have proved to be a very popular and effective means of communication, this type of communications circuit suffers from a number of drawbacks. In particular, a 56 Kb/S and secondary channel circuit places a restriction on the number of consecutive zeros that may be transmitted. Because of this drawback, many customers have opted instead for another type of communications circuit called 64 Kb/S clear channel. The 64 Kb/S clear channel circuit does not utilize framing or control bits and therefore, the full bandwidth is available for communications. In order to accomplish this, in many cases the 64 Kb/S clear channel circuit is overdriven to operate at 72,000 bits per second.

Because a 56 Kb/S and secondary channel circuit, and a 64 Kb/S clear channel circuit both operate at a line speed of 72 Kb/S, it is frequently difficult to determine when a communications circuit has been mis-optioned for one type of communication in favor of the other. For instance, if a customer orders at 64 Kb/S clear channel circuit, but the office channel unit where the circuit is mis-optioned for 56 Kb/S plus and secondary channel, certain types of data may be transmitted without problem. Moreover, certain types of tests, such as the standard bit error rate test, cannot distinguish between the 64 Kb/S clear channel circuit and a 56 Kb/S and second channel circuit. However, when the customer tries to transmit certain types of data, such as packet data, errors may occur when the line is mis-optioned. In many cases, it is necessary to send a service technician to the customer site or to the central office servicing the customer to diagnosis the problem. This can be expensive for telecommunications companies, and frustrating for consumers of the data services.

Accordingly, in light of the above, there is a need for a method for identifying a mis-optioned data communications circuit that does not require a technician to visit the customer premises or central office servicing the customer to identify the mis-optioned circuit. Moreover, there is a need for a method for identifying a mis-optioned data communications circuit that can be utilized to detect a mis-optioned data communications circuit easily and from a remote location.

SUMMARY OF THE INVENTION

The present invention solves the above-described problems by providing a method for identifying a mis-optioned data communications circuit that can identify mis-optioned data communications devices on a data communications circuit without requiring that a technician visit either customer premises or a central office. Moreover, the present invention solves the above-described problems by providing a method for identifying a mis-optioned data communications circuit that permits the easy identification of data communications circuit that have been mis-optioned for data communication at an incorrect bandwidth.

Generally described, embodiments of the present invention provide a method for identifying a mis-optioned data communications circuit. According to one such embodiment, the method comprises configuring the test point providing access to the data communications circuit for operation at a first data communications speed, such as 56 Kb/S with secondary channel. A test may then be performed on a communication device remotely located on the data communication circuit that is incompatible with the data communications at the second data speed. According to one embodiment of the invention, the test comprises a non-latching loop back test that will pass if the communications circuit is configured for 56 Kb/S with secondary channel and that will fail if the communications circuit is configured for 64 Kb/S clear channel communications.

Once the test has been completed, a determination is made as to whether the test is successful. If the test is successful, the tested communications device is optioned for an operation at the second communications speed. In one embodiment of the invention, the second communications speed comprises 64 Kb/S clear channel communications. Moreover, according to various embodiments of the invention, the communications device tested may comprise a network interface unit or a channel service unit/data service unit ("CSU/DSU").

According to another embodiment of the invention, a method if provided for identifying a mis-optioned data communications circuit wherein a test point providing access to the data communications circuit is configured for operation at a first data communications speed. According to one embodiment of the invention, the first data communications speed may comprise 64 Kb/S clear channel communications. Once the test point has been configured, a latching loop back test may be performed on a communications device remotely located on the data communications circuit, such as a network interface unit or a CSU/DSU. If the loop back test is successful, a bit error rate test ("BERT") is then performed on the communications device.

If the BERT is successful, the test point is then configured for operation at a second data communications speed, such as 56 Kb/S with secondary channel. A non-latching loop back test is then performed on the communications device. If the non-latching loop back test is successful, the communications device is mis-optioned for communication at the second data communication speed. Therefore, the communications device is re-optioned for communication at the first communication speed. In this manner, misconfigured communication devices on a data communications circuit may be identified and correctly optioned.

Additional details regarding the various embodiments of the invention provided herein will be appreciated more thoroughly from the detailed description that follows.

DETAILED DESCRIPTION OF AN ILLUSTRATIVE EMBODIMENT

In the following detailed description, references are made to the accompanying drawings that form a part hereof, and in which are shown by way of illustrations specific embodiments or examples. These embodiments may be combined, other embodiments may be utilized, and structural or functional changes may be made without departing from the spirit and scope of the present invention. The following detailed description is, therefore, not to be taken in a limiting sense, and the scope of the various embodiments of the present invention are defined by the appended claims and their equivalence.

Figure 1:
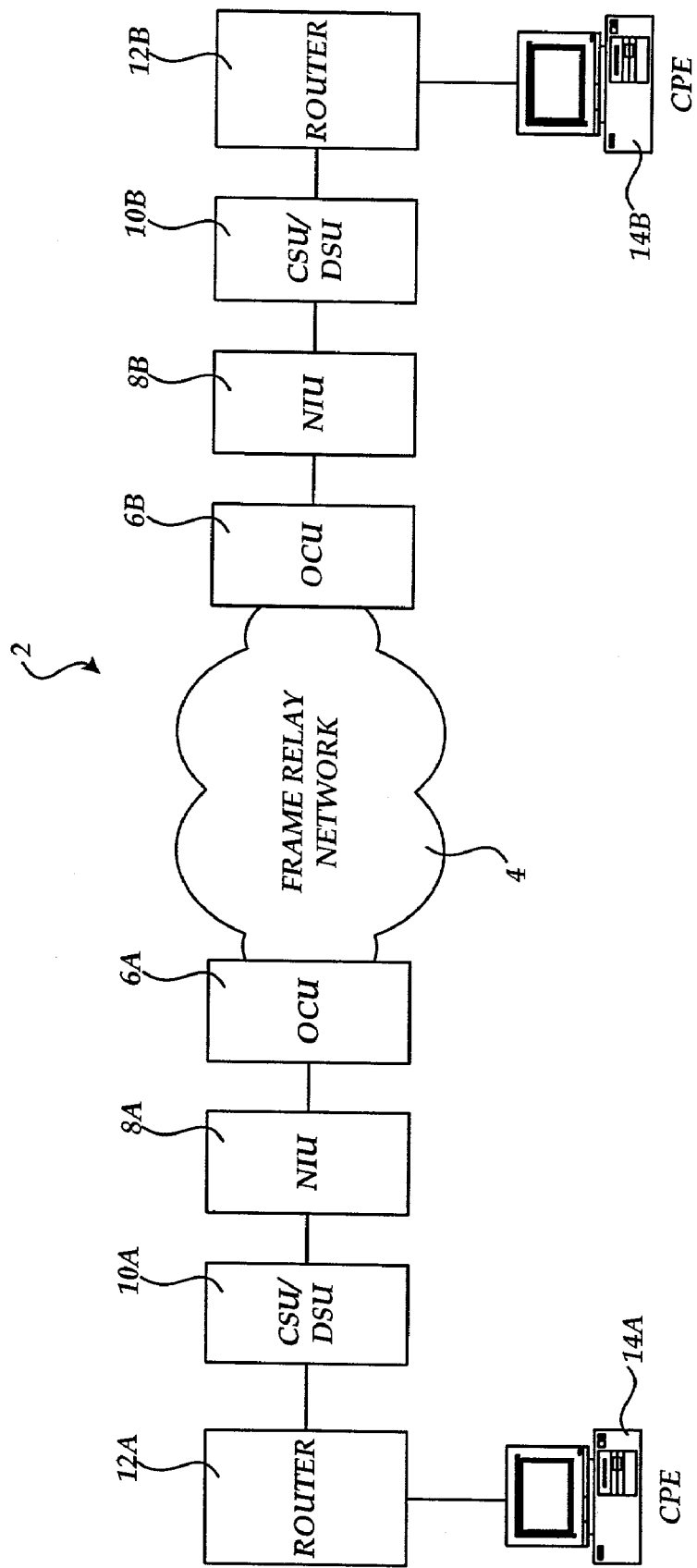
FIG. 1 is a network diagram showing aspects of a data communications network that forms a portion of an illustrative operating environment for embodiments of the present invention.
Figure 2:
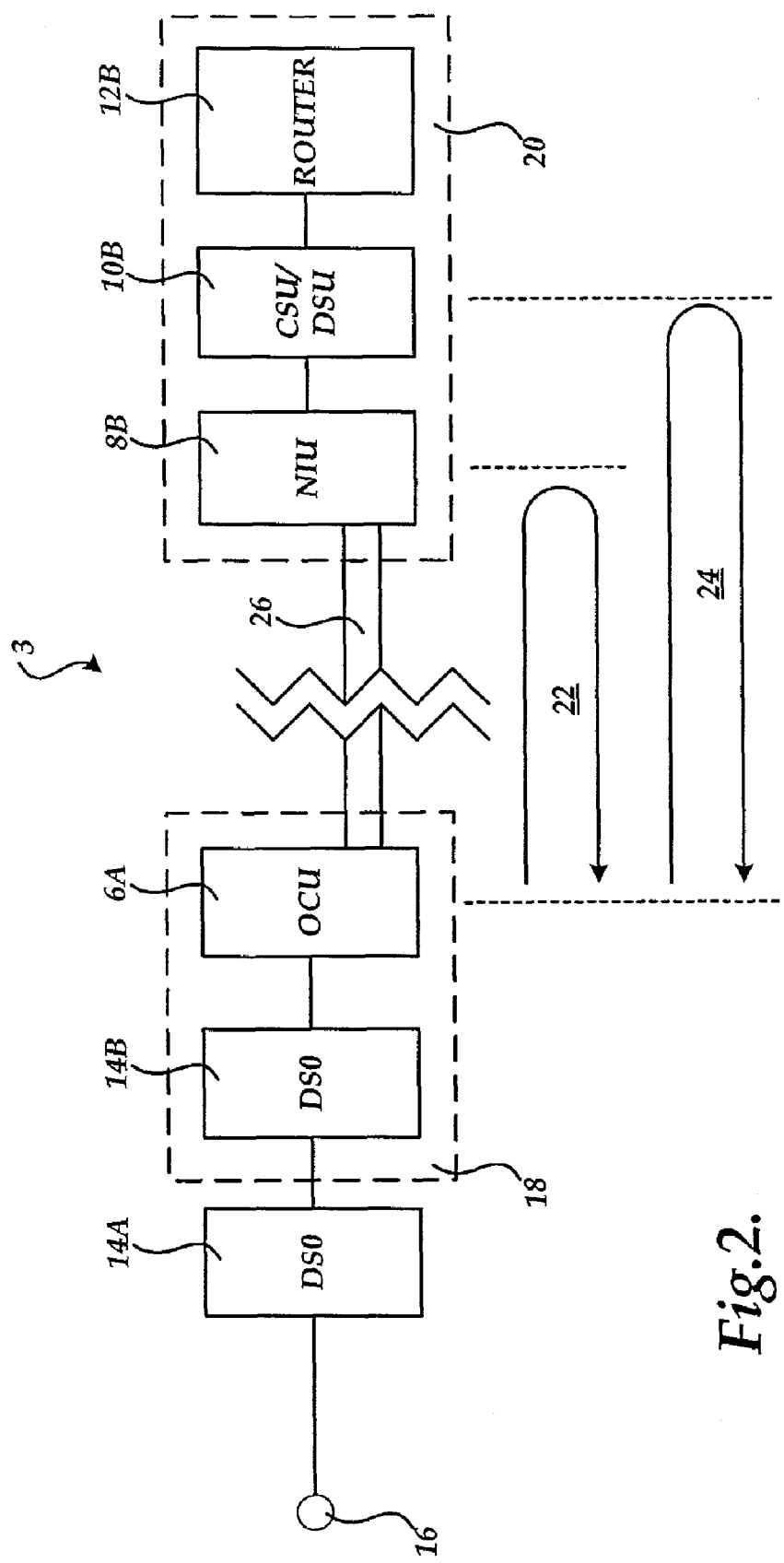
FIG. 2 is a network diagram that shows a data communications circuit that also forms a portion of an illustrative operating environment for embodiments of the present invention.

Referring now to FIG. 1, a data communications network 2 that forms an illustrative operating environment for embodiments of the present invention will be described. As shown in FIG. 2, a frame relay network 4 provides the basis for a point-to-point data communications circuit connecting the customer premises equipment 14A to the customer premises equipment 14B. AS known to those skilled in the art, the frame relay network 4 employs the concept of a shared network. In particular, the network switches accept frames of data, buffer them as required, read the target address and forward them one by one as the next transmission link becomes available. In this fashion, a point-to-point network may be created through the frame relay network 4 between the customer premises equipment 14A and the customer premises equipment 14B. Other aspects of the frame relay network 4 should be apparent to those skilled in the art.

In order to create the physical connection between the CPE 14A and the CPE 14B, an office channel unit 6A, 6B is installed at the edge of the frame relay network 4. As will be described in greater detail below, the OCU 6A or 6B is installed at the central office servicing the customer premises.

Connected to the OCU 6A or 6B, are network interface units 8A and 8B. The NIUs 8A and 8B are located at the customer premises. The NIU 6A and 6B are semi-intelligent devices that serve as a point of physical and logical demarcation between the location exchange carrier and the customer premises. The NIU includes a silicon-based protector that trips the circuit in the event of a lightening strike or some other form of aberrant voltage. The NIU also has enough intelligence to allow the carrier to conduct an automated loop back test, which tests the integrity of the electrically based, twisted-paired local loop from the central office to the customer premises.

Connected to each of the NIUs 8A, 8B, is a CSU/IDSU 10A, 10B. The CSU/DSU 10A, 10B are utilized to access the digital data channels provided through the frame relay network 4. At the customer end of the connection, these devices perform much the same function for digital circuits that modems provide for analog connections. For example, the CSU/DSU 10A, 10B take data from customer premises equipment, encode it, and transmit it. At the receive end, a separate CSU/DSU equalizes the receive signal, filters it, and decodes it for interpretation by the customer premises equipment 14B. As shown in FIG. 1, routers 12A–12B may also be utilized to provide a network interface to the CPE 14A and 14B. Additional details regarding a data communications network 2 such as that shown in FIG. 1 should be apparent to those skilled in the art.

Referring now to FIG. 2, a network diagram will be described that shows a data communications circuit 3 that also forms a portion of an illustrative operating environment for embodiments of the present invention. As shown in FIG. 2, a customer premises location 20 includes a NIU 8B, a CSU/DSU 10B and a router 12B. Also, not shown in FIG. 2, the customer premises location 20 may include customer premises equipment, such as a local area network or other type of computer system for receiving data communications over the network.

The customer premises location 20 is connected to a central office 18 through a twisted-pair telephone connection 26. At the central office 18, an OCU 6A terminates the twisted pair connection 26 and provides a connection to a DS0 communications link 14B. As known to those skilled in the art, a DS0 communications channel comprises a 64 Kb/S communications channel and provides an interface to the frame relay network 4 described above with reference to FIG. 1. Additionally, the DS0 14B may interface with other DS0 connections 14A to provide access to the entire circuit 3 via a test point 16. The test point 16 allows remote testing to be performed on the entire data communications circuit 3 for a remote location.

As shown in FIG. 2, the NIU 8B is capable of responding to commands through the test point 16 to perform a loop back test to the OCU 6A. In particular, the loop back 22 occurs when data is transmitted from the OCU 6A to the NIU 8B and then returned to the OCU 6A. A loop back 24 may also be established between the OCU 6A and the CSU/DSU 10B. In order to establish a loop back 22 or 24, commands may be sent through the circuit 3 to the NIU 8B or the CSU/DSU 10B. Other types of equipment located at the customer premises location 20 may also be looped back to the OCU 6A. As will be described in greater detail below, a loop back test may be utilized to determine whether equipment located at the customer premises location 20 is mis-optioned for communications at a speed other than the speed a which the OCU 6A is optioned.

Figure 3A:
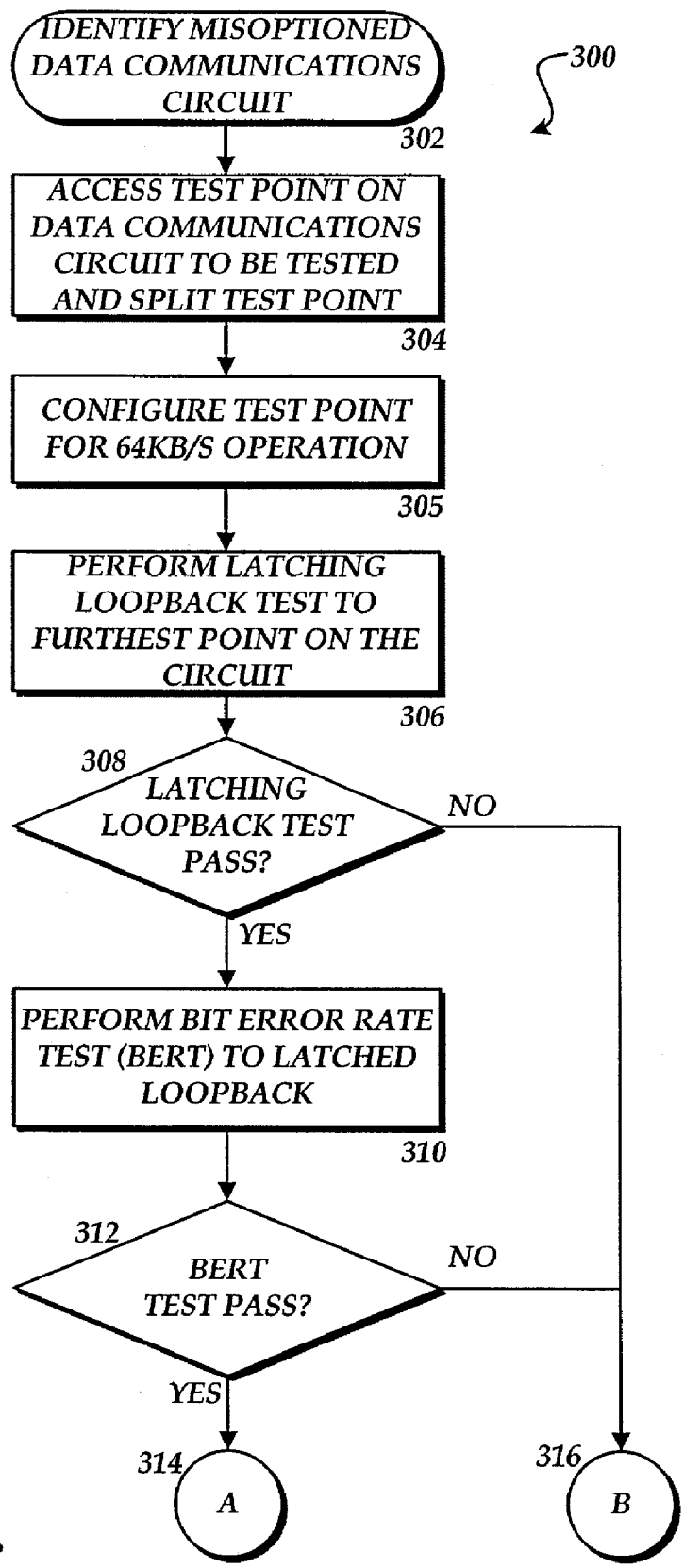
FIGS. 3A–3B are flow diagrams that illustrate a method for identifying mis-optioned data communications circuits according to one actual embodiment of the present invention.
Figure 3B:
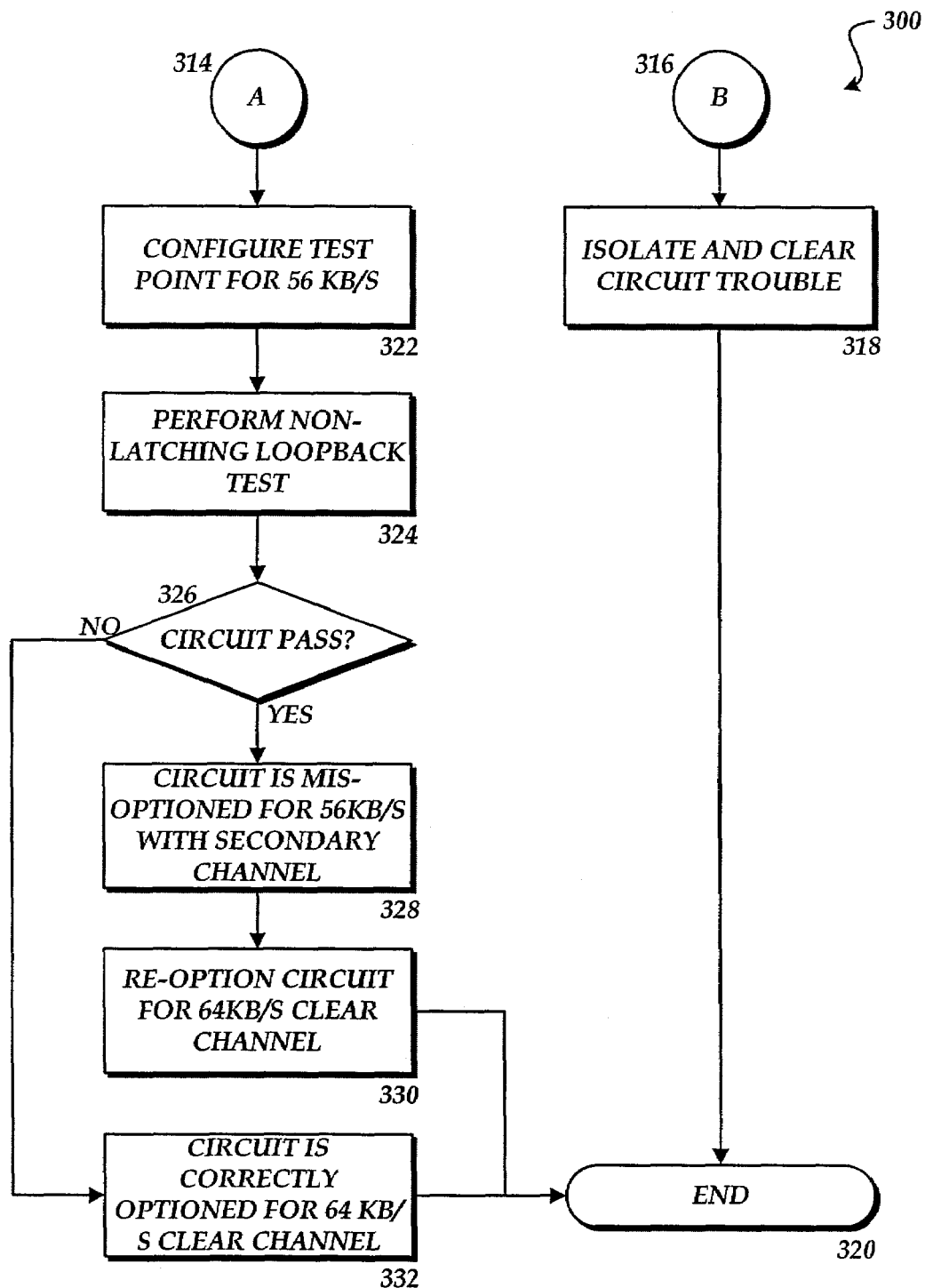

Referring now to FIGS. 3A–3B, a routine 300 will be described for identifying mis-optioned data communications circuits. In particular, the routine 300 is utilized to identify communications devices located remotely on a data communications circuit 3, such as a NIU 8B or a CSU/DSU 10B that is mis-optioned for communications at a different speed other than the speed at which the OCU 6A is configured. The routine 300 begins at block 304, where the test point 16 is accessed for testing the configuration of the NIU 8B or the CSU/DSU 10B.

From block 304, the routine 300 continues to block 305, where the test point 16 is configured for operation at 64 Kb/S clear channel. The routine 300 then continues to block 306, where a latching loop back test is performed to the furthest available point on the circuit 3. In particular, if a CSU/DSU 10B is present at the customer premises location, the latching loop back test will be performed to the CSU/DSU 10B.

However, if no CSU/DSU 10B is present, the latching loop back test will be performed to the NIU 8B.

From block 306, the routine 300 continues to block 308, where a determination is made as to whether the latching loop back test was completed successfully. If the test was not completely successfully, this indicates that trouble exists with the circuit 3 other than a mis-optioned data communications device. Accordingly, the routine 300 branches to block 318 where other type of circuit trouble may be isolated and cleared other than a mis-optioned data communications device.

If the latching loop back test has passed, the routine 300 continues from block 308 to block 310.

At block 310, a bit error rate test is performed on the same data communications device that the latching loop back test was performed on. As known to those skilled in the art, the bit error rate test identifies the percentage of received bits in error compared to the total number of bits received.

From block 10, the routine 300 continues to block 312 where a determination is made as to the whether the BERT test was completed successfully. If the BERT test was not completely successfully, this indicates that other problems exist on the circuit 3 other than a mis-optioned data communications device. Accordingly, if the BERT test is not completed successfully, the routine 300 branches from block 312 to block 318, where other types of circuit trouble may be isolated and cleared. From block 318, the routine 300 continues to block 320, where it ends.

If, however, at block 312, the BERT test is completed is successfully, the routine 300 continues to block 322.

At block 322, the test point 16 is configured for operation at 56 Kb/S and secondary channel. The routine 300 then continues to block 324, where a non-latching loop back test is performed on the appropriate data communications device. According to various embodiments of the invention, the device upon which the non-latching loop back test may be performed may be either the NIU 8B or the CSU/DSU 10B.

It should be appreciated by those skilled in the art, that an NIU 8B or a CSU/DSU 10B that is configured for 56 Kb/S and secondary channel will pass the non-latching loop back test. However, if the NIU 8B or the CSU/DSU 10B is configured for 64 Kb/S clear channel communications, then the non-latching loop back test will fail. In this manner, the non-latching loop back test may be utilized to determine whether the NIU 8B or the CSU/DSU 10B is incorrectly configured for 64 Kb/S with second channel communications.

From block 324, the routine 300 continues to block 326, where a determination is made as to whether the non-latching loop back test was completed successfully. If the non-latching loop back test did not complete successfully, the routine 300 branches from block 326 to block 332. At block 332, a determination is made that the circuit is correctly optioned for 64 Kb/S clear channel communication. The routine 300 then continues to block 320 where it ends.

If, however, at block 326 it is determined that the non-latching loop back test did complete successfully, then the routine 300 continues to block 328 where it is determined that the circuit 3 is mis-optioned for 56 Kb/S with secondary channel communication. Accordingly, the routine 300 continues to block 330 where the NIU 8B or the CSU/DSU 10B is re-optioned for 64 Kb/S clear channel communication. The routine 300 then continues from block 330 to block 320 where it ends.

Based on the foregoing, it should be appreciated that the embodiments of the present invention provide methods for identifying mis-optioned data communications circuits. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for identifying a mis-optioned data communications circuit, comprising:
    configuring a test point providing access to the data communications circuit for operation at a first data communications speed;
    performing a test on a communications device remotely located on the data communications circuit, the test incompatible with data communications at a second data communications speed;
    determining whether the test was successful; and
    in response to determining that the test was successful, performing a bit error rate test on the communications device;
    determining if the bit error rate test was successful;
    in response to determining that the bit error rate test was successful, optioning the communications device for operation at the second data communications speed.

2. The method of claim 1, wherein the test comprises a non-latching loop back test.

3. The A method for identifying a mis-optioned data communications circuit, comprising:
    configuring a test point providing access to the data communications circuit for operation at a first data communications speed;
    performing a test on a communications device remotely located on the data communications circuit, the test incompatible with data communications at a second data communications speed;
    determining whether the test was successful; and
    in response to determining that the test was successful, optioning the communications device for operation at the second data communications speed, wherein the first data communications speed comprises 56 kb/s with secondary channel.

4. The method of claim 3, wherein the second data communications speed comprises 64 kb/s clear channel.

5. The method of claim 4, wherein the communications device comprises a network interface unit.

6. The method of claim 5, wherein the communications device comprises a channel service unit/data service unit.

7. A method for identifying a mis-optioned data communications circuit, comprising:
    configuring a test point providing access to the data communications circuit for operation at a first data communications speed;
    performing a latching loop back test on a communications device remotely located on the data communications circuit;
    determining whether the latching loop back test was successful;
    in response to determining that the loop back test was successful, performing a bit error rate test on the communications device;
    determining if the bit error rate test was successful;
    in response to determining that the bit error rate test was successful, configuring the test point for operation at a second data communications speed;

performing a non-latching loop back test on the communications device;

determining whether the non-latching loop back test was successful; and in response to determining that the non-latching loop back test was successful, optioning the communications device for operation at the first communications speed.

8. The method of claim 7, wherein the communications device comprises a network interface unit.

9. The method of claim 7, wherein the communications device comprises a channel service unit/data service unit.

10. The method of claim 7, wherein the second data communications speed comprises 56 kb/s with secondary channel.

11. The method of claim 7, wherein the first data communications speed comprises 64 kb/s clear channel.

12. A method for identifying a mis-optioned data communications circuit, comprising:

configuring a test point providing access to the data communications circuit for operation at 64 kb/s clear channel;

performing a latching loop back test on a channel service unit/data service unit located on the data communications circuit;

determining whether the latching loop back test was successful;

in response to determining that the loop back test was successful, performing a bit error rate test on the channel service unit/data service unit;

determining if the bit error rate test was successful;

in response to determining that the bit error rate test was successful, configuring the test point for operation at 56 kb/s with secondary channel;

performing a non-latching loop back test on the channel service unit/data service unit;

determining whether the non-latching loop back test was successful; and in response to determining that the non-latching loop back test was successful, optioning the channel service unit/data service unit for operation at 64 kb/s clear channel.

13. A method for identifying a mis-optioned data communications circuit, comprising:

configuring a test point providing access to the data communications circuit for operation at 64 kb/s clear channel;

performing a latching loop back test on a network interface unit located on the data communications circuit;

determining whether the latching loop back test was successful;

in response to determining that the loop back test was successful, performing a bit error rate test on the network interface unit;

determining if the bit error rate test was successful;

in response to determining that the bit error rate test was successful, configuring the test point for operation at 56 kb/s with secondary channel;

performing a non-latching loop back test on the network interface unit;

determining whether the non-latching loop back test was successful; and in response to determining that the non-latching loop back test was successful, optioning the network interface unit for operation at 64 kb/s clear channel.

* * * * *